(No Model.)
W. CROZIER.
DRAFT EQUALIZER.
No. 296,930. Patented Apr. 15, 1884.
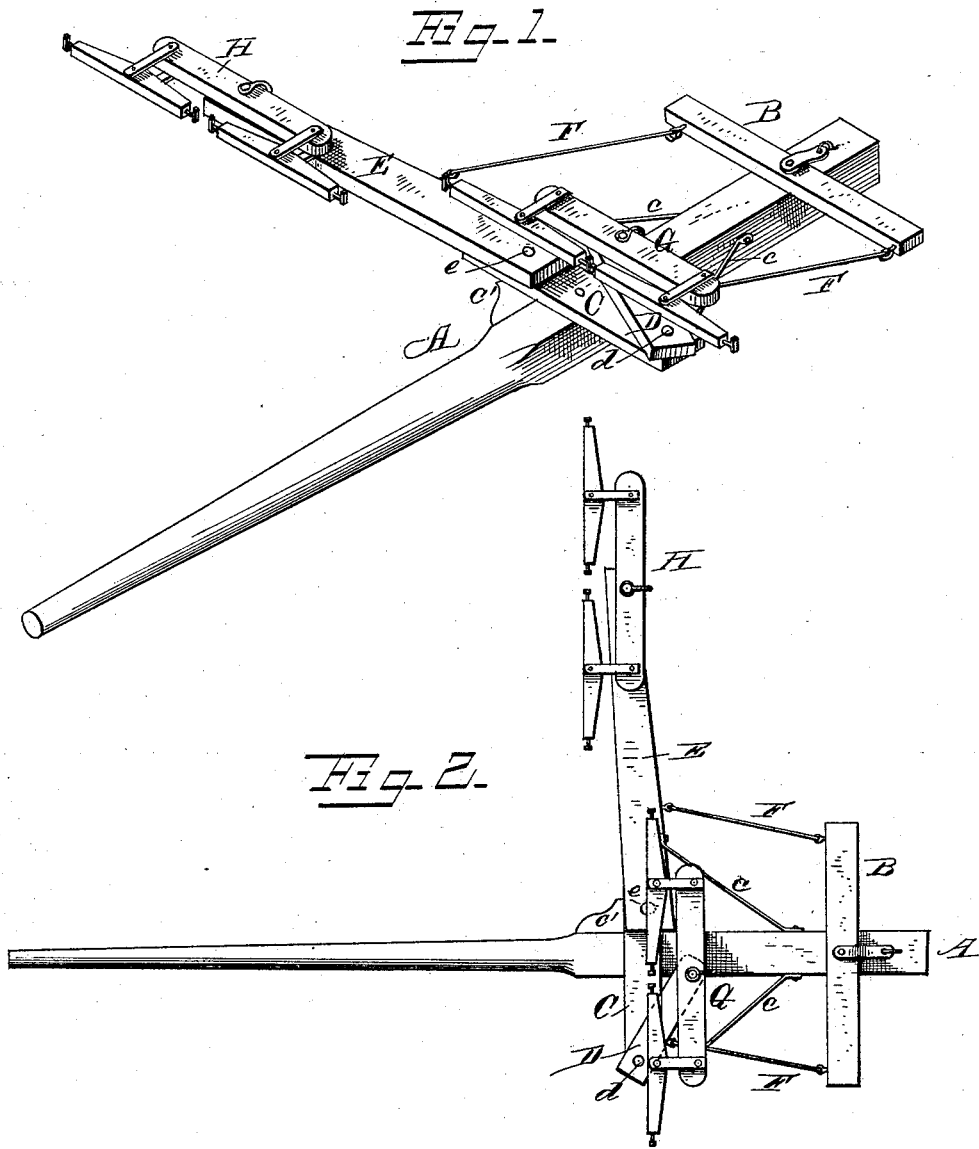
WITNESSES
F. L. Ourand
T. W. Johnson
INVENTOR
William Crozier
Attorney

UNITED STATES PATENT OFFICE.

WILLIAM CROZIER, OF GOODWIN, DAKOTA TERRITORY.

DRAFT-EQUALIZER.

SPECIFICATION forming part of Letters Patent No. 296,930, dated April 15, 1884.

Application filed October 18, 1883. (No model.)

*To all whom it may concern:*

Be it known that I, WILLIAM CROZIER, a citizen of the United States of America, residing at Goodwin, in the county of Deuel and Territory of Dakota, have invented certain new and useful Improvements in Draft-Equalizers; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to certain new and useful improvements in draft-equalizers, its object being to provide a means whereby three or more horses may be secured to a vehicle or agricultural implement, so that each horse will perform his share of the work; and it consists in the construction and organization of the parts, as will be hereinafter more fully set forth and illustrated.

In the accompanying drawings, which illustrate my invention, Figure 1 is a perspective view, and Fig. 2 is a plan view.

A represents the pole of the vehicle or agricultural implement, which is secured to the same in the ordinary manner. Said pole is provided at its rear end with a pivoted cross-bar, B, which extends equally on each side of the pole, and to a short distance in front of this cross-bar B is rigidly secured the cross-bar C, which is firmly braced to the pole by means of the bars c c; and. if desirable, the pole or tongue may be provided with a block, c', located to one side of the same, to which this cross-bar C may be bolted, the aforesaid block serving as a brace.

To the upper side of the rigid cross-bar C are pivoted two arms, D E, the arm D being pivoted at the end of the cross-bar C by means of a bolt, d, while the longer arm E is pivoted adjacent to the pole, and a little to one side of the same, by means of the bolt e. These arms are connected to the rear pivoted cross-bar by rods F F.

To the ends of the pivoted arms D E are attached by suitable clevises the double-trees G H, which are of equal length and are of ordinary construction. Each of these doubletrees have attached at their ends swivel single-trees.

In the accompanying drawings I have illustrated my invention as organized for a four-horse equalizer, though when it is desirable to use the same as a three-horse draft-equalizer the double-tree H is removed and the single-tree attached to the pivoted arm E at a point slightly beyond the rod F, which connects the same with the cross-bar B.

The operation of my invention, when employed as a four-horse equalizer, is as follows: The horses being hitched so that one will be to one side of the pole and three on the other, if the horses attached to the whiffletree G move forward faster than the horses attached to the whiffletree H, they will draw the whiffletree forward, which will cause the pivoted arm D to spring forward upon the pivots d, which will communicate the motion to the pivoted cross-bar B, so as to draw the opposite pivoted arm E backward, which arm carries the whiffletree H. The same results will be attained if the whiffletree H is drawn forward.

By the systems of leverage which are employed, each horse will be compelled to do his full share of work, though, if desired, by means of bolt-holes, so that the whffletree can be adjusted, one pair of horses can be made to perform a greater portion of work than another pair.

Having thus described my invention, what I claim as new, and desire to secure by Letters Patent, is—

The combination, in a draft-equalizer, of the tongue A, bar B, centrally pivoted thereto, bar C, rigidly secured to the tongue, arms D E, respectively pivoted at the ends of the rigid bar C, the bar D extending toward the center and having secured to its rear end a pivoted bar, G, and affording therefor a central pivot-bearing carrying the central draft devices at each end, a bar, H, centrally pivoted at the outer end of the arm E and carrying whiffletrees, and connecting-rods F, one of which is connected to the bar D and bar B, for the purpose set forth.

In testimony whereof I affix our signature in presence of two witnesses.

WILLIAM CROZIER.

Witnesses:
 M. S. WEEKS,
 G. W. COGGSWELL.